United States Patent [19]

Coles

[11] Patent Number: 4,896,621
[45] Date of Patent: Jan. 30, 1990

[54] METHOD OF MODIFYING A BOAT HULL TO OBTAIN ENHANCED LIFT AND ROUGH WATER STABILITY

[76] Inventor: Charles F. Coles, P.O. Box 244, South Hamilton, Mass. 01982

[21] Appl. No.: 225,998

[22] Filed: Jul. 29, 1988

[51] Int. Cl.4 .................................................. B63B 1/38
[52] U.S. Cl. .................................. 114/274; 114/67 R; 114/67 A; 114/284; 114/288
[58] Field of Search .................... 114/67 A, 67 R, 274, 114/279, 284, 285, 286, 287, 288, 289

[56] References Cited

U.S. PATENT DOCUMENTS

| | | | |
|---|---|---|---|
| 2,989,269 | 6/1961 | Le Bel | 114/289 |
| 3,117,545 | 1/1964 | Warner | 114/67 A |
| 3,117,547 | 1/1964 | Cohen et al. | 114/285 |
| 3,141,436 | 7/1964 | Cathers et al. | 114/67 A |
| 3,221,697 | 12/1965 | Allegretti | 114/274 |
| 3,357,390 | 8/1965 | Wray | |
| 3,372,663 | 10/1966 | Lo Bue | |
| 3,424,120 | 1/1969 | Koriagin | 114/67 R |
| 3,477,400 | 11/1969 | Walker | 114/289 |
| 3,604,384 | 9/1971 | Coles | |
| 3,763,811 | 10/1973 | Danahy | |
| 4,237,810 | 12/1980 | Westfall | 114/288 |
| 4,523,536 | 6/1985 | Smoot | 114/67 A |
| 4,606,291 | 8/1986 | Hoppe | |
| 4,649,851 | 3/1987 | April | |
| 4,665,853 | 5/1987 | Gerdsen et al. | |
| 4,715,304 | 12/1987 | Steinberg | |

FOREIGN PATENT DOCUMENTS

| | | | |
|---|---|---|---|
| 477050 | 7/1976 | Australia | 114/274 |
| 1421624 | 11/1965 | France | 114/274 |
| 124594 | 12/1960 | New Zealand | 114/67 A |

Primary Examiner—Sherman D. Basinger
Assistant Examiner—Thomas J. Brahan
Attorney, Agent, or Firm—David H. Semmes

[57] ABSTRACT

Hydrofoil craft, particularly a method of economically modifying a conventional hull by means of foils to obtain enhanced lift and rough water stability. The method is characterized by defining an axial tunnel(s) intermediate the bow and transom of a catamaran hull or V-bottom hull modified with chine mounted aerofoils; positioning a flexible dihedral foil beneath the water line and on either side of the bow so as to obstruct and create a turbulence in the forward end of the tunnel, while cushioning shock and lifting the bow; and simultaneously enclosing the transom end of the tunnel with a foil, so as to compress the turbulence and lift the transom.

6 Claims, 7 Drawing Sheets

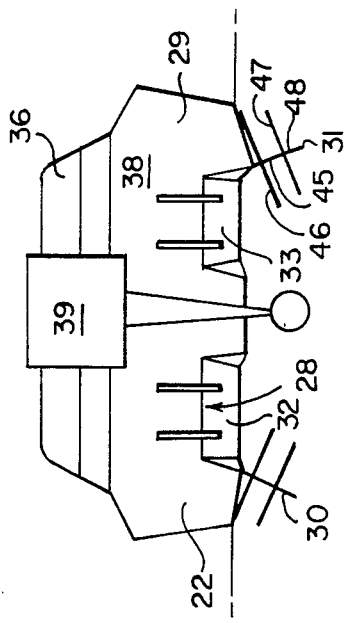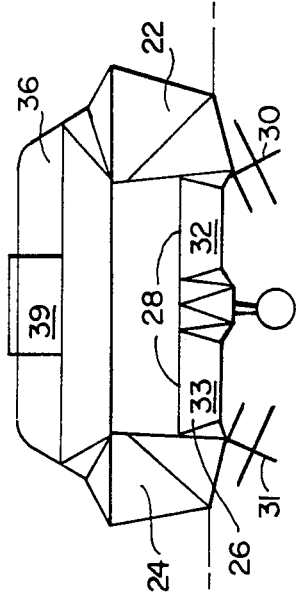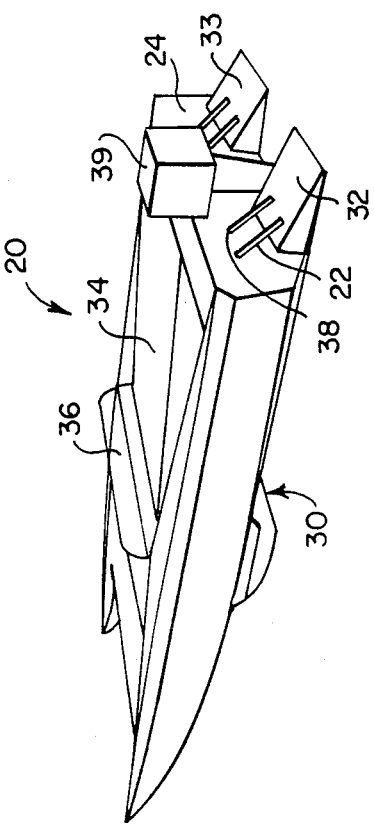

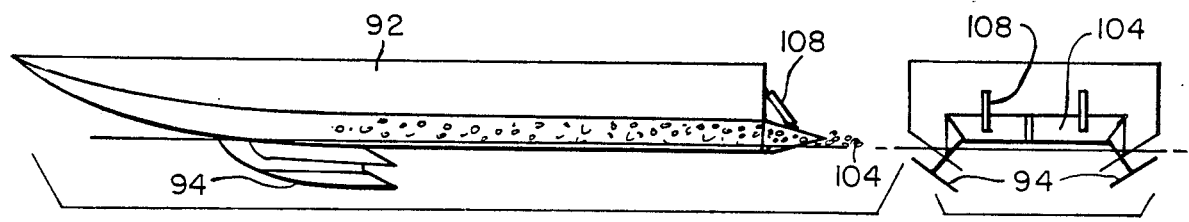
FIG. 21
FIG. 27
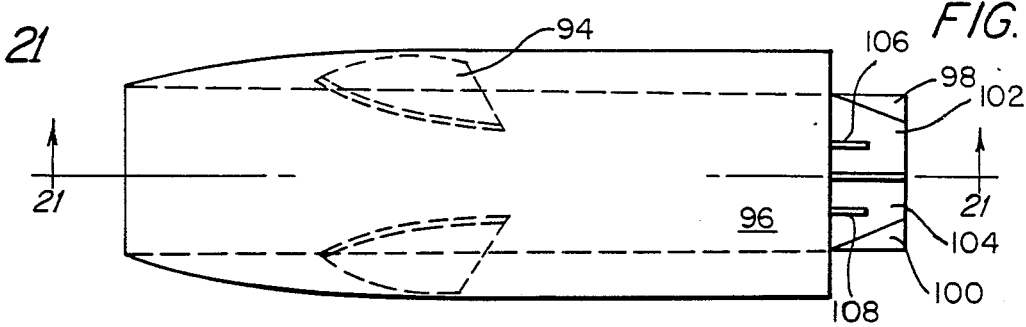
FIG. 22
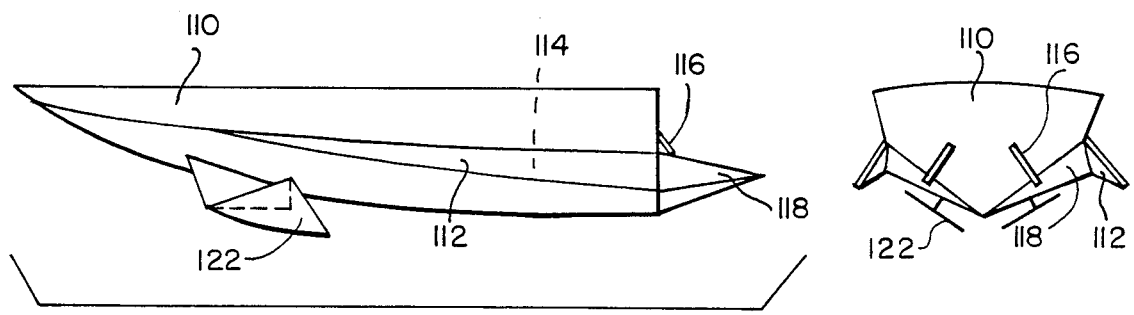
FIG. 23
FIG. 24
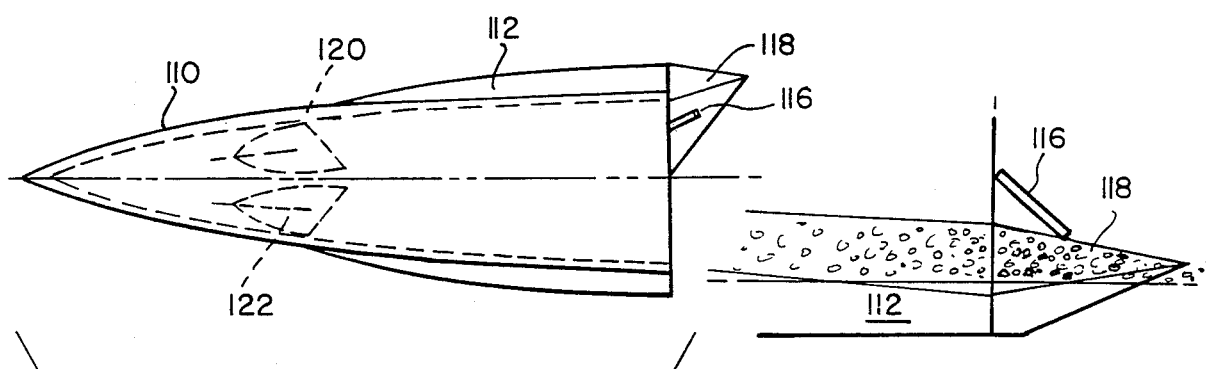
FIG. 25
FIG. 26

METHOD OF MODIFYING A BOAT HULL TO OBTAIN ENHANCED LIFT AND ROUGH WATER STABILITY

BACKGROUND OF THE INVENTION

1. Field of the Invention

Hydrofoil craft, particularly the use of flexible foils to obtain a very high ratio of speed to horsepower, by enhancing lift and stability in rough water.

2. Description of the Prior Art

WRAY, U.S. Pat. No. 3,357,390
LO BUE, U.S. Pat. No. 3,372,663
COLES, U.S. Pat. No. 3,604,384
DANAHY, U.S. Pat. No. 3,763,811
HOPPE, U.S. Pat. No. 4,606,291
APRIL, U.S. Pat. No. 4,649,851
GERDSEN et al., U.S. Pat. No. 4,665,853
STEINBERG, U.S. Pat. No. 4,715,304

SUMMARY OF THE INVENTION

A method of modifying a boat hull to obtain enhanced lift and rough water stability. The method includes defining or modifying with chine aerofoil skirts an axial tunnel(s) intermediate the bow and transom of the boat hull, positioning flexible dihedral foils below the water line and on the bow so as to obstruct and create turbulence in the forward end of the tunnel while cushioning and lifting the bow. Simultaneously, the transom end of the tunnel is enclosed with stern foils so as to compress said turbulence and thereby lift the transom.

Particularly a hydrofoil system for modifying a hull in order to obtain excellent stability and performance at high speeds in rough water resulting from substantial hull lift, viz:

1. Hydrodynamic lift from the twin swept back, surface piercing, flexible forward hydrofoils.

2. Hydrodynamic lift from the tunnel(s) on a catamaran hull or a V bottom hull modified with chine mounted aerofoils and stern foil(s) by compressing the flow of dense spray at high velocity with the stern foil(s).

3. High pressure and lift in the tunnel and on the chine and/or stern foils from dense spray at high velocity with the transom end of the tunnel(s) restricted by the stern foil(s).

The substantial hull lift generated by the foil system reduces the rough water wave profile impacted by the hull, so as to reduce wave shock and improve hull stability and performance at high speeds.

DESCRIPTION OF THE DRAWINGS

FIG. 1 is a side perspective view of a catamaran hull modified according to the present invention.

FIG. 2 is a rear elevation thereof.

FIG. 3 is a front elevation.

FIG. 21 is a side elevation of a twin tunnel hull having forward foils and a pair of stern transom foils.

FIG. 22 is a plan thereof.

FIG. 23 is a side elevation of a V-bottom hull modified with a chine aerofoil skirt 112 to define axial tunnels interrupted by the forward foils and the rear transom foils 118.

FIG. 24 is a rear elevation.

FIG. 25 is a plan of the V-bottom hull illustrated in FIGS. 23 and 24.

FIG. 26 is a fragmentary enlarged side elevation of the V-bottom hull illustrated in FIGS. 23 and 24 and showing compression of the tunnel turbulence and dense spray by means of rear foils 118.

FIG. 27 is a rear elevation of the boat illustrated in FIG. 21.

DESCRIPTION OF THE PREFERRED EMBODIMENTS

Figure 4:
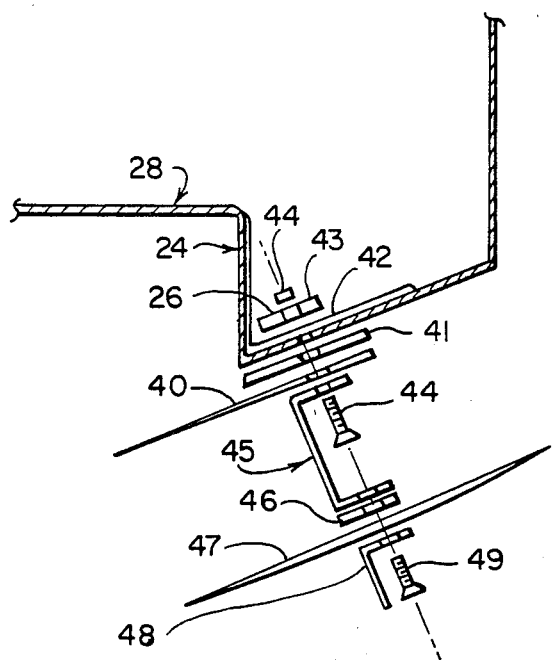
FIG. 4 is an enlarged fragmentary front elevation, partially in section showing the fitting of twin flexible foils 40, 47 adjacent the bow of a boat.

The invention may be directed to a catamaran form of hull readily fabricated from metal or moldable plastic material and modified to including a tunnel(s) defined between two hull sections or pontoons or created on a V-bottom hull with chine and pairs of foils fore-and-aft adapted to be acted upon both by water and by air in order to assist in lifting the hull when the boat is under power. The forward foils on the bow of the boat are formed as surface piercing hydrofoils and so shaped that they cooperate in creating turbulence, spray and waves in the stream passing through the tunnel while assisting in increasing the flotation lift of the hull which is largely out of the water when the boat is traveling at high speeds. A combination of lift foils is provided by the forward surface piercing hydrofoils, the tunnel as a surface effects hull and the rear or transom foils in the form of a hovercraft skirt.

FIGS. 1, 2, 3, and 11, show a catamaran hull indicated generally at 20 and having integral port and starboard pontoons 22 and 24 respectively. Hull 20 may be fabricated from metal or molded integrally of a plastic material already well known for boat hull purposes, such as polyurethane. Regardless of the mode of construction, the pontoons 22, 24 define between them an axial tunnel 26, including a lift surface 28, cooperatively associated with pairs of fore flexible foils indicated generally at 30, 31 and a pair of stern or transom foils 32, 33. The form, function and mode of operation of the foil pairs 30, 31 and 32, 33 are explained below.

Hull 20 further includes open cockpit 34, furnished with windshield 36. At the rear, cockpit 34 is closed by a transom 38 appropriately reinforced to support an outboard motor 39 or, alternatively, an inboard or outboard drive which may be of reasonably small power for the speeds which are attained in rough water. For example, with a 235 horsepower motor, a 23 foot boat modified in accordance with the present invention has been propelled relatively smoothly in 5 foot waves at a speed of approximately 50 miles per hour. As shown in all views, forward port and starboard foil pairs 30, 31 are separately attached with bolts to the respective outside pontoon surfaces. Similarly, separate aft port and starboard foils 32 and 33 are individually secured to the hull.

As shown in FIG. 4, the starboard dihedral foil assembly 31 may comprise main cantilevered flexible foil 40, rubber shock pad 41 to reduce shock and fatigue of the metal foil, reinforcing 42 in the starboard pontoon, a bolt plate 43, and a bolt and lock nut 44. In addition, the starboard foil assembly 31 may comprise a channel 45, rubber shock pad 46, a lower cantilevered flexible foil 47, rubber shock 46, a fence 48 for added directional stability and seating of bolt and lock nut 49. The bolts allow the entire foil assembly or only the lower foil 47 and fence 48 to be easily removed for replacement or repair. Foils 40, 47 which bend in torsion may be replaced with larger or smaller foils depending on requirements for higher speed or rough water operations.

Figure 5:
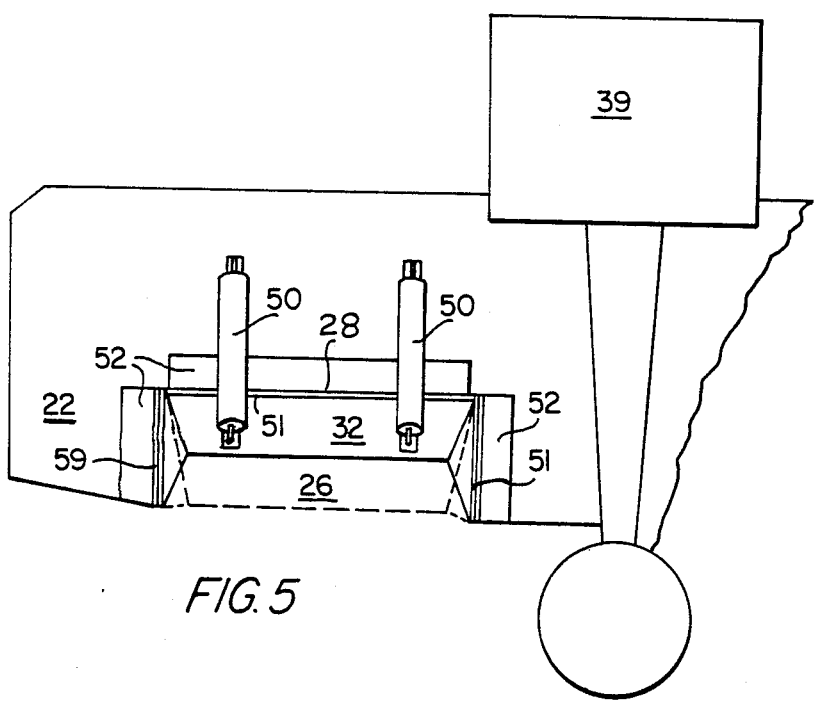
FIG. 5 is a fragmentary rear elevation, showing a stern foil hovercraft type skirt.
Figure 6:
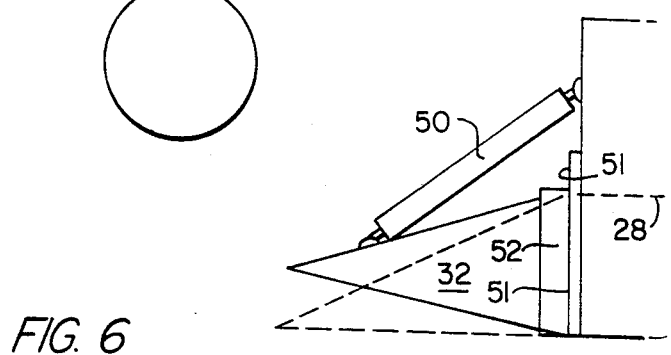
FIG. 6 is a fragmentary side elevation, showing a stern foil hovercraft skirt, pivoted on the transom and as shown in FIG. 5.

FIG. 5 shows stern or transom foil 32 which can be raised or lowered by hydraulic or pneumatic ram or rams 50. When the boat is traveling at high speeds into surface winds, the combined air and spray are dense and have a large velocity through the tunnel when aft foil 32 in the form of a hovercraft skirt is raised. When foil 32 is lowered, the density of the spray is increased, generating increased pressure and lift within tunnel 26, on lift surface 28 and on the pair of transom foils 32 and 33. As illustrated in FIG. 5, transom foils 32 and 33 are attached to hull 22 and 24 with gasket 51 held in place with clamp 52 to prevent air escaping between foil 32 and hull 22. Increased hull lift by lowering stern foil 32 reduces shock when hull 22 is going into the wind in rough water, having an increased wave frequency and profile. The design at the stern foil tends to prevent the bottom of the foil from being lifted above the surface of the water and cause the propeller(s) to cavitate.

Figure 8:
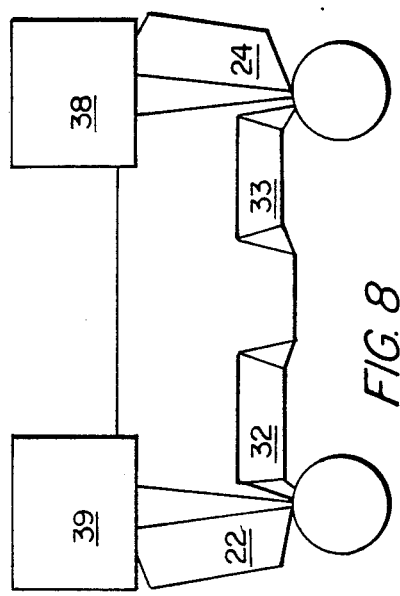
FIG. 8 is a similar rear elevation of a twin tunnel hull construction having dual rear engines.
Figure 10:
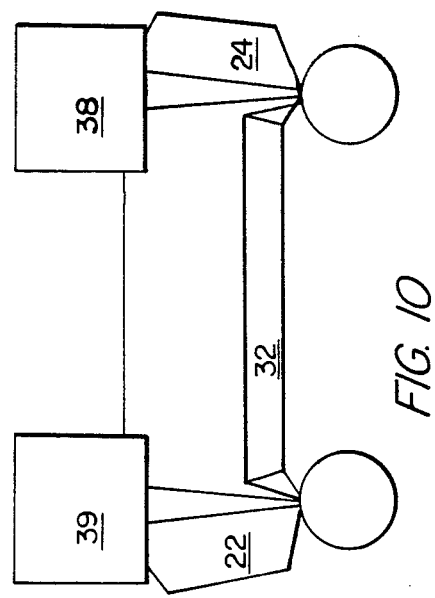
FIG. 10 is a showing of a hull having a single tunnel with twin engines.
Figure 7:
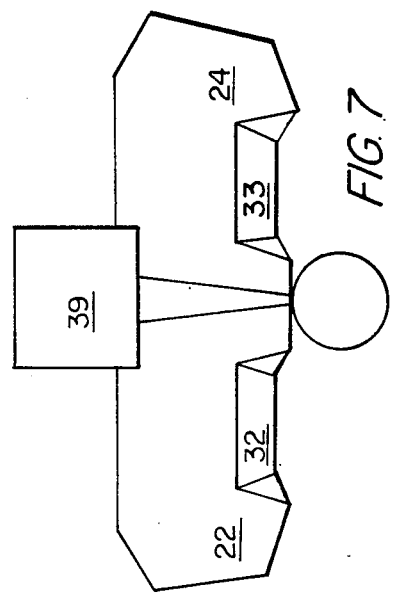
FIG. 7 is a rear elevation of a twin tunnel hull construction having a single rear engine.
Figure 9:
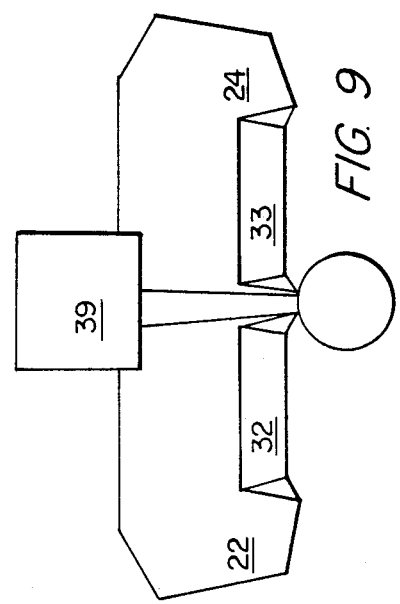
FIG. 9 is a showing of a modified twin tunnel construction having a single rear engine.
Figure 11:
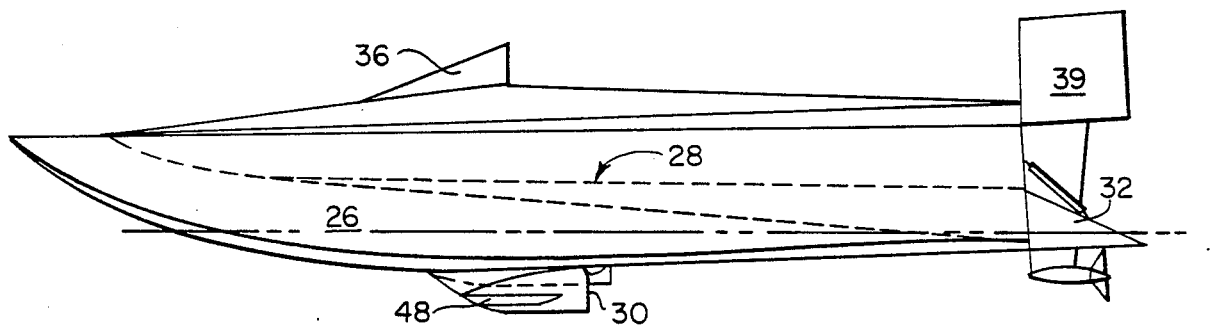
FIG. 11 is a side elevation, partially in phantom, showing the catamaran hull of FIGS. 1 and 2 embodying pairs of forward and stern twin foils.
Figure 12:
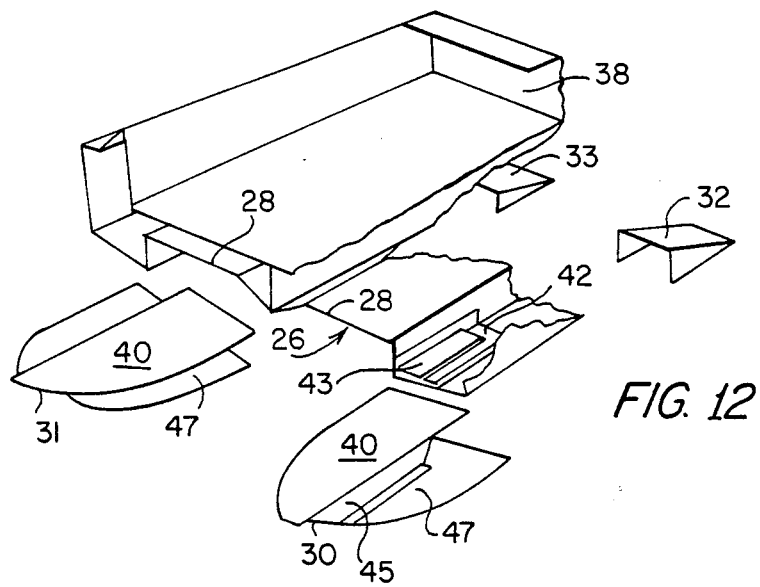
FIG. 12 is a fragmentary enlarged section showing fitting of the pairs of foils adjacent the bow and stern to intersect the tunnels.
Figure 13:
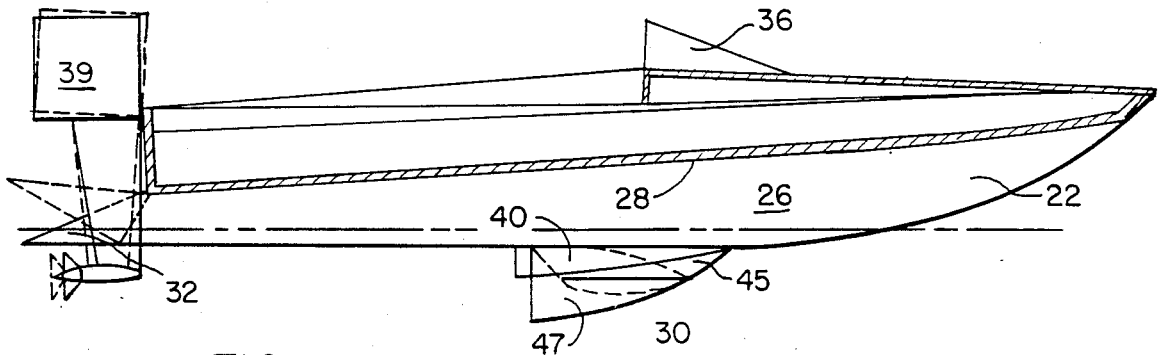
FIG. 13 is a longitudinal section of the boat illustrated in FIG. 11 and showing the boat underway at low speed.
Figure 14:
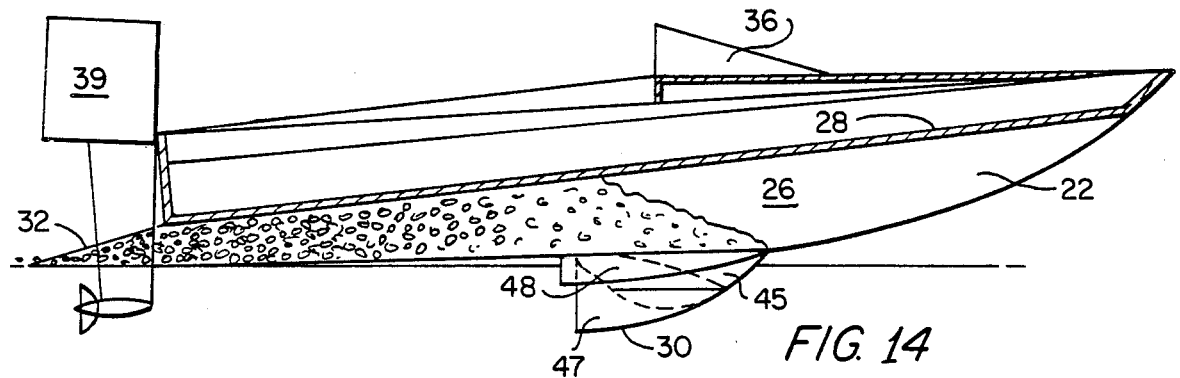
FIG. 14 is a similar longitudinal view showing the FIGS. 11 and 13 hull underway at high speed with the transom 32 closed, so as to compress the turbulence within tunnel 26.
Figure 15:
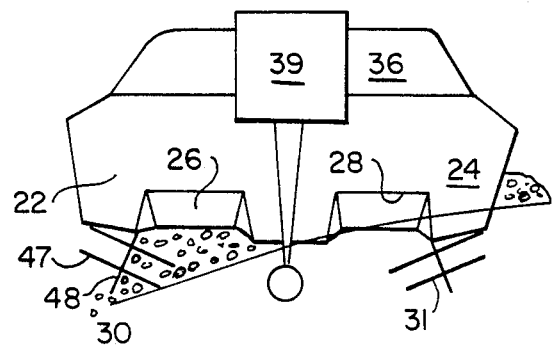
FIG. 15 is a rear elevation of the boat illustrated in FIG. 15.
Figure 16:
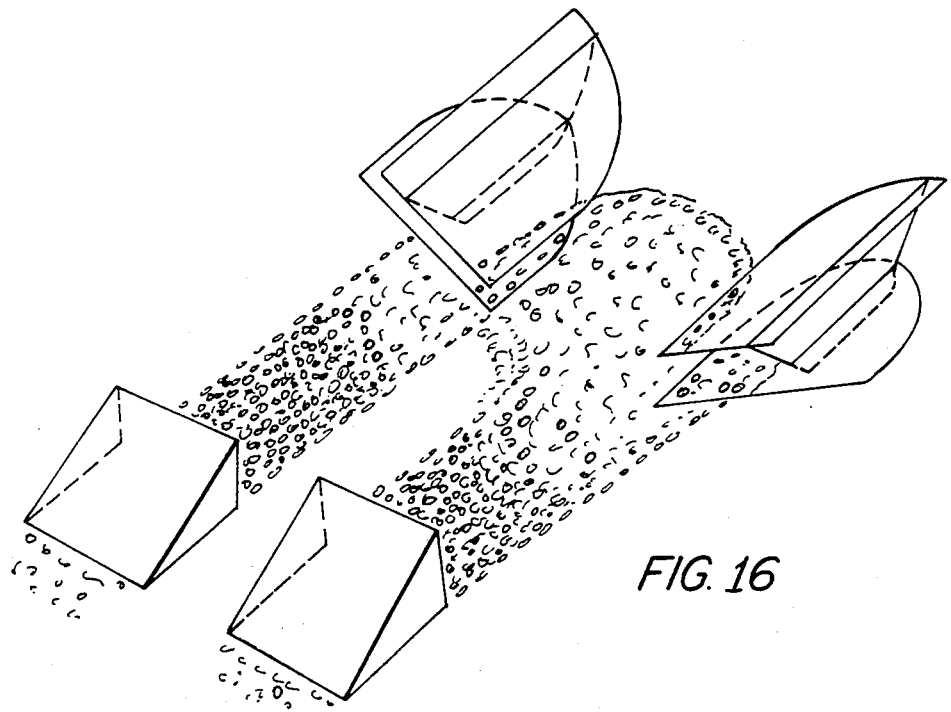
FIG. 16 is a schematic exploded view of the boat shown in FIGS. 11, 13 and 14, and illustrating the action of the pairs of forward foils and the rear transom foil. The turbulence and dense spray created by the pair of forward foils and the compression of this turbulence in the tunnels and by the transom foils enclosing the tunnels, is indicated by increasing bubble density aft.

FIG. 7 shows rear foils 32 and 33 mounted on a twin tunnel hull powered by single engine 39. FIG. 8 shows foils 32 and 33 mounted on a twin tunnel hull powered by two engines 38, 39, and FIG. 10 shows a single foil 32 mounted on a single tunnel hull with two engines. FIG. 9 shows foils 32 and 33 mounted on a twin tunnel hull with a single engine.

As illustrated in FIGS. 13 to 16, the bow foils 30, 31 and transom foils 32, 33 cooperate with tunnel 26 to provide lift to the hull, according to the surface effects principle and in a manner which is not completely understood. It is theorized, however, that a part of the lift is derived from the action of the water and to a lesser degree the action of the air upon the forward surfaces of the pontoons 22 and 24. The water and the air combine to form a dense spray which also exerts an upward force on the foils themselves, i.e., forward hydrofoils 30, 31 and on the hovercraft type rear foils 32, 33. In addition, water and dense spray in the form of turbulence created by the forward foils exert upward forces in the tunnel especially upon the relatively large horizontal lift surfaces in accordance with the surface effects principle. In addition, when the boat is in the position of FIG. 14 while being operated at high speed, dense spray and waves are compressed in the rearward portion of the tunnel and not only exert an upward force directly, but also indirectly. The water, dense spray and foam, at large velocity being compressed by motion of the boat between the walls of the tunnel in the rear of the tunnel and on the rear foils, exert considerable lift.

Figure 17:
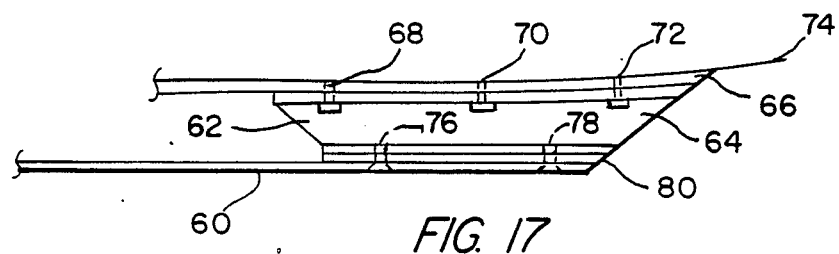
FIG. 17 is a fragmentary side elevation of a flexible forward foil.
Figure 18:
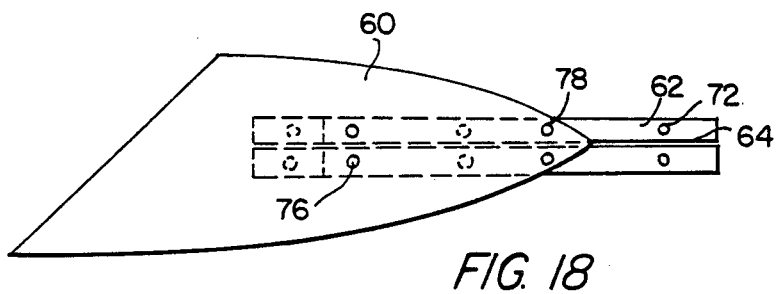
FIG. 18 is a bottom plan of the foil illustrated in FIG. 17.

In FIG. 17, there is illustrated the construction of a flexible forward foil 60 which is mounted upon I-beam 62 and includes a curvate, swept back configuration such that the foil passes over debris without damage and bends in torsion so as to reduce fatigue from bending. The leading edge 64 of I-beam 62 is inclined downwardly and aft, so as to reduce drag and a shock pad 66 may be fitted intermediate the I-beam 62 and the hull exterior 74 prior to fastening with through bolts 68, 70 and 72. Similarly shock pad 80 may be secured intermediate I-beam 62 and the foil 60 by means of through holes 76, 78.

Figure 19:
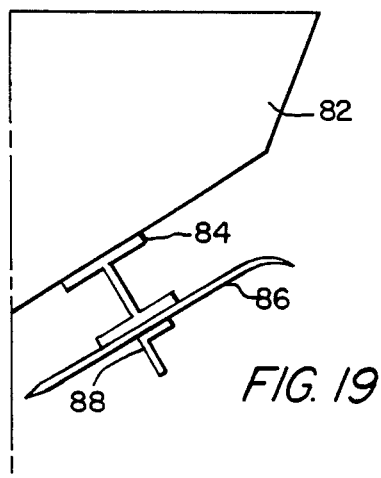
FIG. 19 is a fragmentary end elevation illustrating placement of a forward foil on a V-bottom boat.

FIG. 19 illustrates the placement of a forward foil 86 on a V-bottom hull by means of I-beam 84 and includes angle fence 88.

Figure 20:
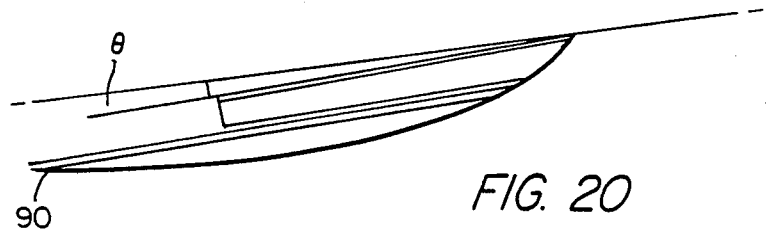
FIG. 20 is a schematic illustration of the use of shims or hydraulic means to adjust the $\theta$ [theta] angle of attack of the forward foil.

FIG. 20 is a schematic side view designating theta ($\theta$) as the angle of attack of forward foil which may be adjustable by means of shims or hydraulic controls (not illustrated).

FIGS. 21, 22 and 27 detail a single tunnel 96 construction, having bow mounted foils 94, transom foils 102 104 hydraulically actuated by struts 106, 108. Hovercraft type skirts 98, 100 may be employed, also, to enclose the transom end of the tunnel 96.

As illustrated in FIGS. 23–26, in addition to the forward foils 122 mounted beneath the V-bottom hull 110, it is possible to obtain even greater lift and stability from dense spray by the use of winglike longitudinal chine mounted aerofoils 112 mounted between the chine and skeg of the hull from midsection to the stern to generate two tunnels to cooperate with the already described foils and hull surfaces. As in the above-described constructions, transom foils 118 may be actuated by hydraulic cylinder 116.

I claim:

1. Method of modifying a powered boat hull to obtain enhanced lift and rough water stability, comprising:
   (a) defining at least one axial tunnel extending from the bow to the transom of the boat hull;
   (b) positioning a pair of flexible foils on each side of the bow and beneath the water line and boat hull so as to obstruct and create turbulence of dense spray in the forward end of the tunnel, while cushioning shock and lifting the bow; and (c) simultaneously peripherally enclosing the transom end of the tunnel with a foil forming a skirt extending substantially across said tunnel, so as to prevent air escaping and to compress said turbulence and thereby lift said transom.

2. Method of modifying a powered boat hull to obtain enhanced lift and rough water stability as in claim 1, including varying said enclosing the transom end, so as to control the amount of lift of said hull.

3. Method of modifying a powered boat hull to obtain enhanced lift and rough water stability as in claim 2, wherein said hull is a catamaran.

4. Method of modifying a powered boat hull to obtain enhanced lift and rough water stability as in claim 2, wherein said hull is a V-hull.

5. Method of modifying a powered boat hull to obtain enhanced lift and rough water stability as in claim 4, including enclosing the sides of said tunnel fore and aft by extending a chine aerofoil skirt on either side of said hull from the point of attachment of said foils to the transom.

6. Method of modifying a powered boat hull to obtain enhanced lift and rough water stability, comprising:

(a) defining twin axial tunnels intermediate the bow and transom of the hull;

(b) positioning a pair of flexible foils on each side of the bow and beneath the water line and boat hull so as to obstruct and create turbulence of dense spray in the forward end of each tunnel, while cushioning shock and lifting the bow; and (c) simultaneously peripherally enclosing the transom end of each tunnel with a foil forming a skirt extending substantially across its respective tunnel, so as to prevent air escaping and to compress said turbulence of dense spray and lift said transom.

* * * * *